United States Patent
Chang

(10) Patent No.: US 7,800,665 B2
(45) Date of Patent: Sep. 21, 2010

(54) METHOD AND APPARATUS FOR IMAGE PROCESSING

(75) Inventor: Han-Jen Chang, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 471 days.

(21) Appl. No.: 11/898,464

(22) Filed: Sep. 12, 2007

(65) Prior Publication Data

US 2008/0158381 A1 Jul. 3, 2008

(30) Foreign Application Priority Data

Dec. 27, 2006 (TW) .............................. 95149291 A

(51) Int. Cl.
*H04N 5/202* (2006.01)
(52) U.S. Cl. .................................................... 348/254
(58) Field of Classification Search .............. 348/223.1, 348/254, 671, 655; 382/162, 167; 358/518, 358/519, 520, 521, 522, 523
See application file for complete search history.

(56) References Cited

U.S. PATENT DOCUMENTS

| | | | | |
|---|---|---|---|---|
| 4,409,614 A * | 10/1983 | Eichler et al. | ............... | 358/530 |
| 4,663,663 A | 5/1987 | Lee | | |
| 4,685,071 A * | 8/1987 | Lee | .............. | 382/162 |
| 5,668,596 A * | 9/1997 | Vogel | ...................... | 348/222.1 |
| 6,573,932 B1 * | 6/2003 | Adams et al. | ............ | 348/224.1 |
| 7,081,918 B2 * | 7/2006 | Takemoto | ............... | 348/223.1 |
| 7,158,174 B2 * | 1/2007 | Gindele et al. | ........... | 348/224.1 |
| 7,286,703 B2 * | 10/2007 | Kaku | ......................... | 382/167 |
| 7,609,299 B2 * | 10/2009 | Nakamura | ............... | 348/222.1 |
| 2002/0036696 A1 * | 3/2002 | Takemoto | ................... | 348/223 |
| 2003/0142222 A1 | 7/2003 | Hordley | | |
| 2003/0184660 A1 | 10/2003 | Skow | | |
| 2006/0078216 A1 * | 4/2006 | Kaku | ......................... | 382/254 |
| 2006/0232685 A1 * | 10/2006 | Takemoto | ................ | 348/223.1 |

FOREIGN PATENT DOCUMENTS

JP 2000-125123 4/2000
TW I259326 6/2006

OTHER PUBLICATIONS

English language translation of abstract of JP 2000-125123 (published Apr. 28, 2000).
English language translation of abstract of TW I259326 (published Aug. 1, 2006).

* cited by examiner

*Primary Examiner*—Jason Chan
*Assistant Examiner*—Nicholas G Giles
(74) *Attorney, Agent, or Firm*—Thomas, Kayden, Horstemeyer & Risley

(57) ABSTRACT

An image processing method is provided. A digital image is outputted by an optical sensor and includes M pixels. The ith pixel among the M pixels has an ith set of original gray levels, wherein i is an integer index ranging from 1 to M. In the method according to this invention, M sets of logarithm values are first generated. The ith set of logarithm values among the M sets of logarithm values is generated based on the ith set of original gray levels and a set of adjusting parameters relative to the optical sensor. Statistics of the M sets of logarithm values is then gathered. According to the statistics result, a target color temperature of the digital image is determined.

10 Claims, 7 Drawing Sheets

METHOD AND APPARATUS FOR IMAGE PROCESSING

BACKGROUND OF THE INVENTION

1. Field of the Invention

The invention relates to a method and apparatus for image processing, and particularly, to an image processing method and apparatus for white balance correction.

2. Description of the Prior Art

In general, the color of an object will change with the color of the light illuminated on the object. This change can be automatically corrected by human eyes, but the optical sensor of a digital camera lacks this function. Thus, the photos taken under different lights generally have different color temperatures. For example, the photo taken in an environment illuminated by a tungsten lamp may be slightly yellow; the photo taken under the shadow may be slightly blue.

Many image processing systems have the function of white balance correction. The goal of white balance correction is to adjust the lightness of the three primary colors—red, green, and blue in a digital image to adjust the color error induced by the light. So that the photo taken by the digital camera can be closer to what human eyes see.

Determining the color temperature of the light source in an image is usually the first step of performing the white balance correction. The most traditional color temperature determining method is based on the gray world assumption proposed by R. M. Evans in 1946. A digital image is composed of a plurality of pixels. Each of the pixels has a red grey level, a green grey level, and a blue grey level respectively. According to the gray world assumption, under the normal color temperature, the average pixel values of the three colors red, green, and blue should be roughly equivalent. Thus, if the average value of certain color in an image is higher than the average values of the other two colors, the color of the image has a deviation due to the effect of the light.

In the color temperature determining method based on the gray world assumption, the average red value, the average green value, and the average blue value of all pixels in a digital image are firstly calculated. Then, the highest of the three average values is selected. If the red average value of certain image is higher than the green average value and blue average value, the image will be judged as slightly red. In other words, the color temperature of the light source in this image is slightly low.

However, the color of the object itself and the effect caused by the light in the image are not separately considered by the above-mentioned color temperature determining method. If the main object of an image is red even without the effect of external light, the color temperature of the light of the image can be incorrectly judged by the method and an incorrect white balance correction is performed thereafter.

Beside the RGB color space, the CIE color space is also a mode for showing colors. Referring to FIG. 1, FIG. 1 is a diagram of the CIE color space. The colors of the light sources of different temperatures can be marked on the CIE coordinate diagram. Connecting the marked points can obtain a curve 100 as shown in FIG. 1. The curve 100 is usually called the "black body locus" or "Plankian locus". Roughly, the color temperature of the light source corresponding to the right side of the curve 100 is lower, and the color temperature of the light source corresponding to the left side of the curve 100 is higher.

In order to solve the above problem of incorrectly judging the color temperature, an existed color temperature determining method only considers the pixels around the curve 100 in the image when the color temperature of the light source of an image is judged, namely, only the pixels in the range 110 are considered. In the color temperature determining method, first, the red, green, and blue grey levels of all pixels in an image are converted into the CIE color space. Then, statistics of the amount of pixels in the range 110 are gathered. If there are more pixels on the right side of the range 110, the color temperature determining method will judge that the color temperature of the light source in the image is low.

The drawback of this method is that converting the red, green, and blue grey levels of all pixels into the CIE color space first is a trouble in calculation. Moreover, in practical applications, whether a pixel is in the range 110 is usually judged via the calculation of the distance between the pixel and the curve 100. Because the curve 100 is not a regular line, it is also very troublesome to calculate the distance between each of the pixels and the curve 100.

In order to solve the two problems above, another color temperature determining method is provided by U.S. Pat. Nos. 4,663,663 and 4,685,071. The Plankian locus has an exponential characteristic. Thus, through a proper logarithm conversion, the Plankian locus can be converted into a line in a logarithm coordinate. Referring to FIG. 2, the longitudinal axis and the transverse axis of the coordinate diagram are respectively $Log(G/R)$ and $Log(G/B)$, wherein R, G, B respectively represent the grey levels of the three colors red, green, and blue of a pixel. The curve 200 is converted from the Plankian locus, and is roughly a straight line. Correspondingly, the range 110 in FIG. 1 is also converted into the range 210 in FIG. 2.

The color temperature determining method provided by the two patents above is to gather statistics of the amount of the pixels in the range 210. If there are more pixels within the right side of the range 210, the color temperature of the light source of the image is judged to be low. The advantage of the method is that the red, green, blue grey levels need not to be converted into the CIE color space. The drawback of the invention is that it is still troublesome to calculate the distances between each of the pixels and the curve 200.

SUMMARY OF THE INVENTION

In order to solve the above problems, the invention provides a method and an apparatus for image processing. In the method and apparatus based on the invention, after a logarithm conversion, the Plankian locus is further converted into a horizontal line to simplify the procedure of judging whether a pixel is in certain predetermined range.

A digital image is outputted by an optical sensor and includes M pixels. The ith pixel among the M pixels has an ith set of original gray levels, wherein i is an integer index ranging from 1 to M. A preferred embodiment according to the invention is an image processing method. In the image processing method, M sets of logarithm values are first generated. The ith set of logarithm values among the M sets of logarithm values is generated based on the ith set of original gray levels and a set of adjusting parameters relative to the optical sensor. According to the invention, the set of adjusting parameters can be generated and stored in a camera in advance based on the characteristics of the optical sensor in the camera before the camera leaves the factory. Then, statistics of the M sets of logarithm values is gathered and a target color temperature of the digital image is determined according to the statistic result.

Another preferred embodiment according to the invention is an image processing apparatus. The apparatus includes a logarithm value generating module, a statistics gathering module, and a color temperature determining module. The logarithm value generating module is used for generating M sets of logarithm values. The ith set of logarithm values among the M sets of logarithm values is generated based on the ith set of original gray levels and a set of adjusting parameters relative to the optical sensor. The statistics gathering module is used for gathering statistics of the M sets of logarithm values. The color temperature determining module is used for determining a target color temperature of the digital image according to the statistics result of the statistics gathering module.

After the target color temperature is determined, the method and apparatus according to the invention can further include a step/module for performing white balance correction on the digital image.

The advantage and spirit of the invention may be understood by the following recitations together with the appended drawings.

BRIEF DESCRIPTION OF THE APPENDED DRAWINGS

Figure 5A:
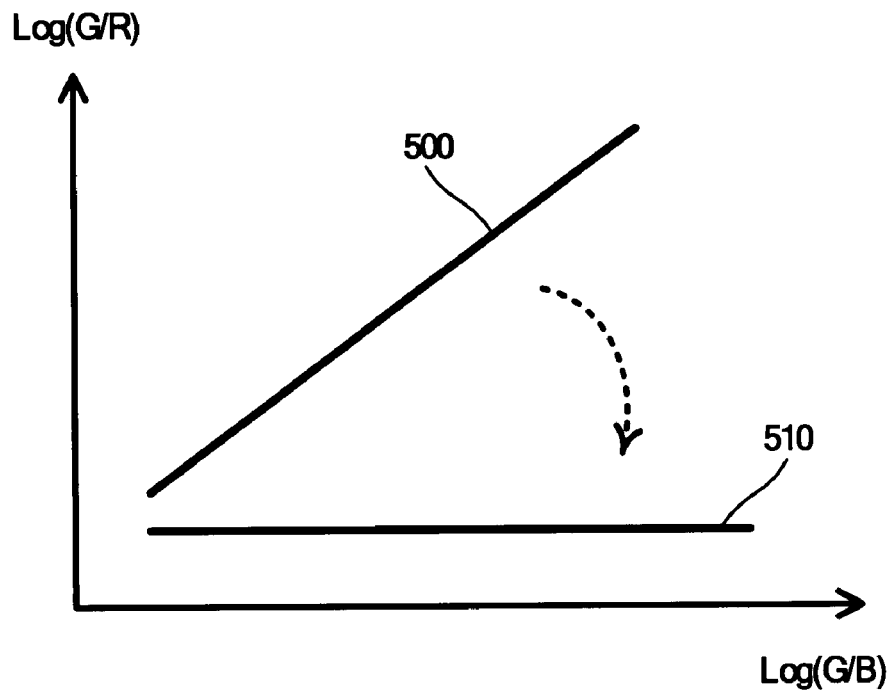
Figure 5B:
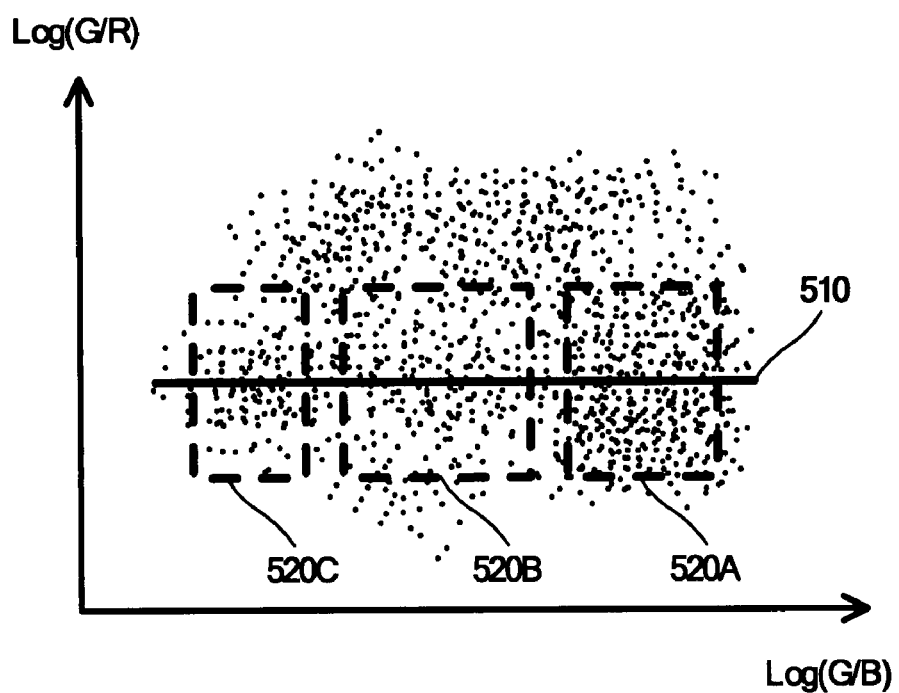
Figure 5C:
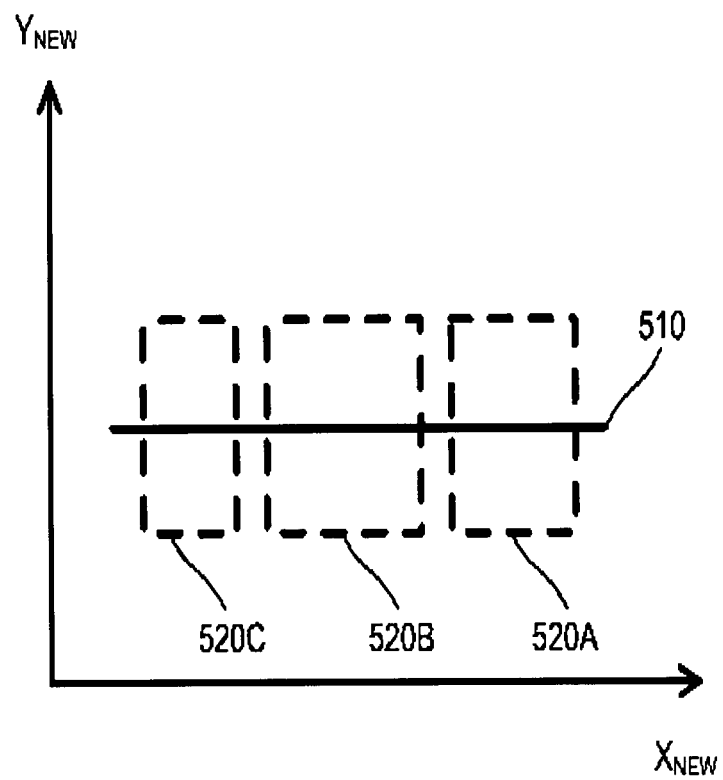
Figure 5D:
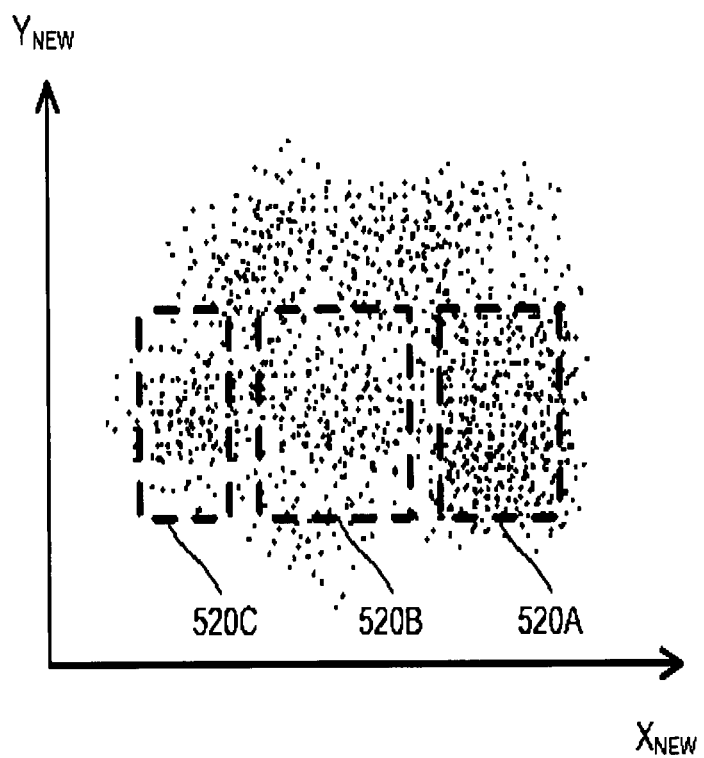

FIG. 5A is a diagram of the first logarithm plane and the first logarithm curve; FIG. 5B is a diagram of the second logarithm plane and the second logarithm curve; FIG. 5C is a diagram of a plurality of logarithm ranges; FIG. 5D is a diagram of a plurality of coordinate points and logarithm ranges.

Figure 6:
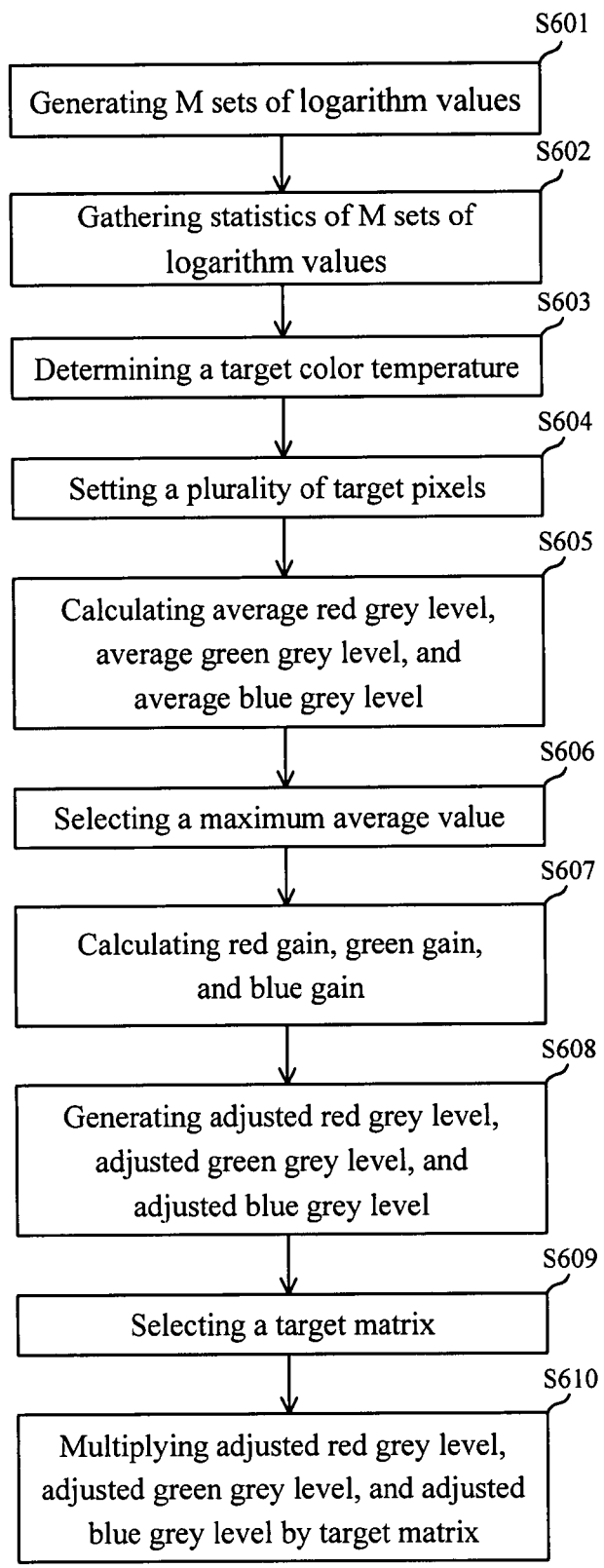

FIG. 6 is a flow diagram of the image processing method of the second preferred embodiment according to the invention.

Figure 7A:
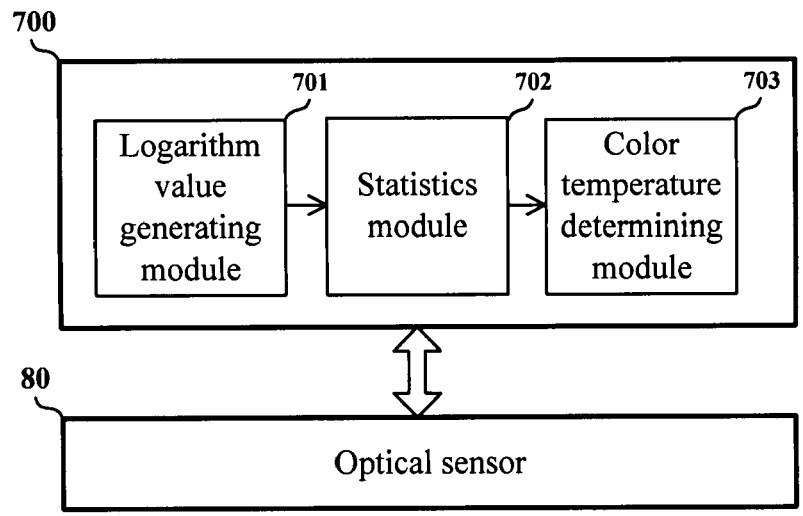
Figure 7B:
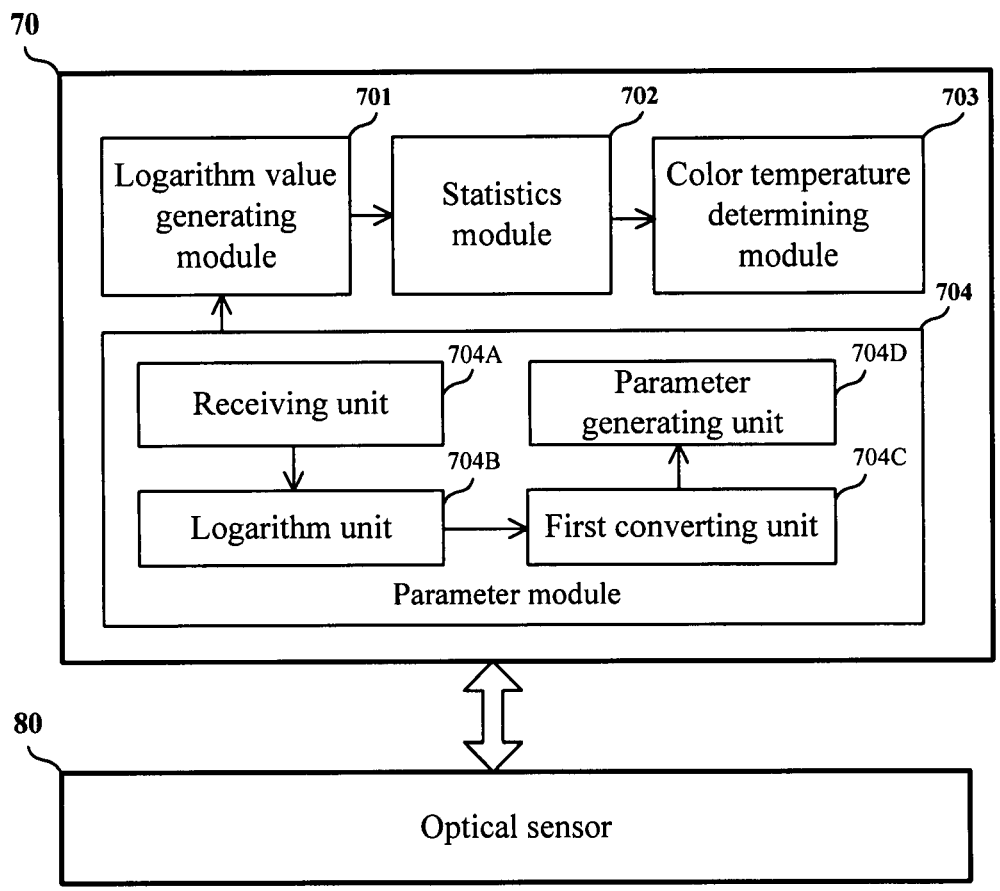
Figure 7C:
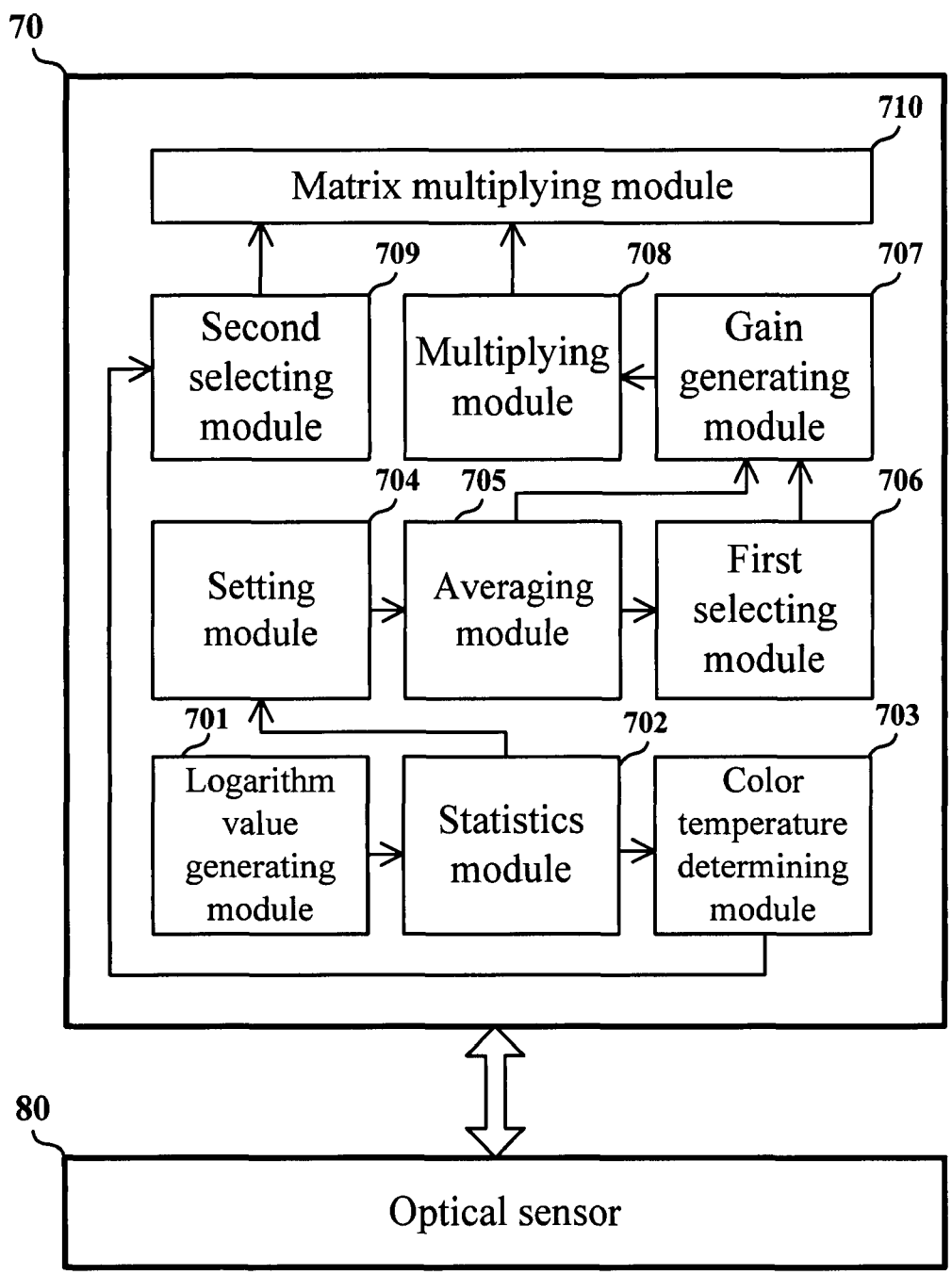

FIG. 7A is a block diagram of the image processing apparatus of the third preferred embodiment according to the invention; FIG. 7B is an embodiment derived from FIG. 7A; FIG. 7C is a block diagram of the image processing apparatus of the fourth preferred embodiment according to the invention.

DETAILED DESCRIPTION OF THE INVENTION

The invention provides an image processing method and image processing apparatus. Compared to the prior arts, the method and apparatus according to the invention include a simpler and faster procedure of determining the color temperature, and can also be combined with other white balance correction procedures.

Figure 1:
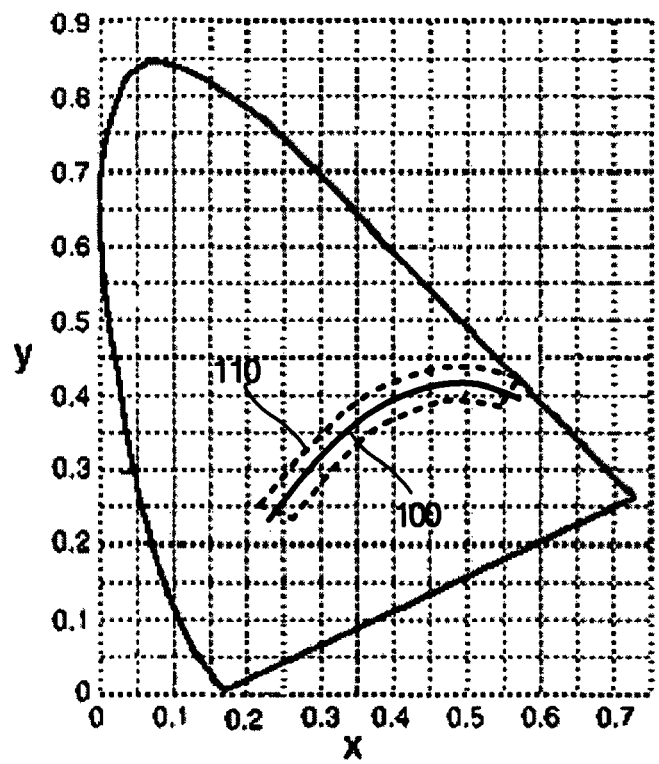
FIG. 1 is a diagram of the CIE color space.
Figure 2:
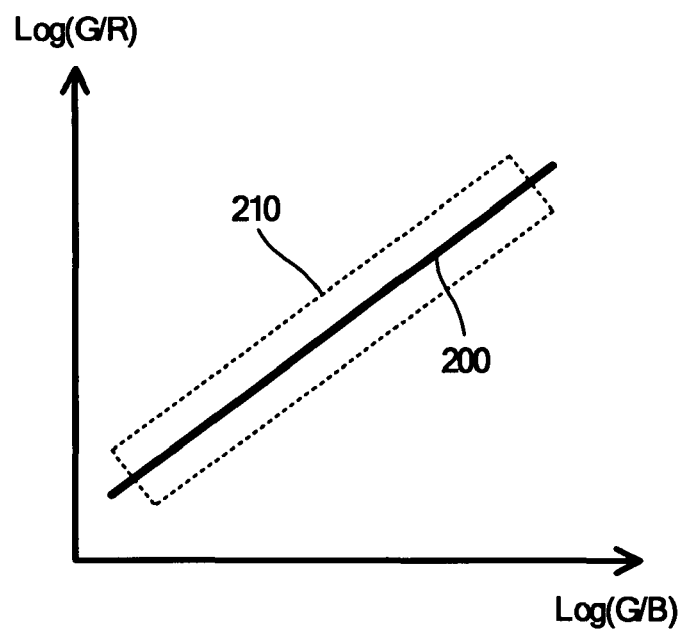
FIG. 2 is the converted logarithm coordinate and logarithm curve.
Figure 3:
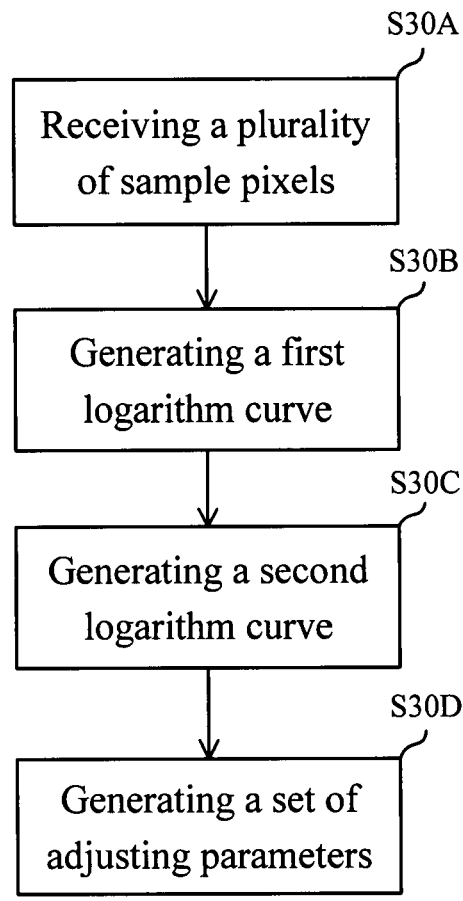
FIG. 3 is the flow diagram of the method of generating the adjusting parameter according to the invention.

The characteristics of the optical sensor in different types of cameras are all different. In the method and apparatus according to the invention, a set of adjusting parameters can be generated for white balance correction based on the characteristics of the optical sensor of a camera before it leaves the factory. Referring to FIG. 3, FIG. 3 is a flow diagram of the method for generating the set of adjusting parameters.

In order to cover conditions corresponding to various kinds of light sources, the camera with the optical sensor can be used to shoot a color checker under different light sources first and thereby generate a plurality of sample pixels. In step S30A of the method, the sample pixels are received by the optical sensor. Each sample pixel has a set of sample grey levels respectively; each of the sets of sample grey levels includes a red sample grey level ($R_S$), a green sample grey level ($G_S$), and a blue sample grey level ($B_S$).

In step S30B, a first logarithm curve is generated on a first logarithm plane according to the sample grey levels. For example, if a longitudinal axis and a transverse axis of the first logarithm plane are Log(G/R) and Log(G/B) respectively, in step S30B, Log($G_S/R_S$) and Log($G_S/B_S$) of each sample pixel are calculated respectively. After the calculated results are marked on the first logarithm plane, the first logarithm curve can be a regression curve of the marked points. Referring to FIG. 5A, the curve 500 is an example of the first logarithm curve. In practical applications, the longitudinal axis and the transverse axis of the first logarithm plane are not limited to be Log(G/R) and Log(G/B), they can also be Log [R/(R+G+B)] and Log [B/(R+G+B)].

As shown in FIG. 5A, a specific included angle θ is usually existent between the first logarithm curve and the transverse axis of the first logarithm plane. In step S30C, the first logarithm curve can be converted into a second logarithm curve by changing the coordinate axis of the first logarithm plane and generating a second logarithm plane. The curve 510 in FIG. 5B is an example of the second logarithm curve. As shown in FIG. 5B, the second logarithm curve is approximately parallel to the transverse axis of the second logarithm plane. In an embodiment, the longitudinal axis ($Y_{NEW}$) and the transverse axis ($X_{NEW}$) of the second logarithm plane can respectively be:

$$X_{NEW}=\text{Log}(G)*\cos(\theta)-\text{Log}(R)*\cos(\theta)+\text{Log}(G)*\sin(\theta)-\text{Log}(B)*\sin(\theta), \text{ and}$$

$$Y_{NEW}=\text{Log}(G)*\cos(\theta)-\text{Log}(B)*\cos(\theta)-\text{Log}(G)*\sin(\theta)+\text{Log}(R)*\sin(\theta).$$

Afterward, in step S30D, the set of adjusting parameters is generated according to the difference between the first logarithm curve and the second logarithm curve. According to the set of adjusting parameters, the red, green, blue grey levels of a pixel can be directly converted into points on the second logarithm plane.

In addition, as shown in FIG. 5C, before a camera leaves the factory, a designer can define a plurality of logarithm ranges according to the second logarithm curve of the camera (e.g., 520A~520C). Each of the logarithm ranges corresponds to a color temperature respectively. Because the characteristics of the optical sensor in different types of cameras are all different, each type of camera has its unique first logarithm curve, second logarithm curve, adjusting parameters, and logarithm ranges.

According to the invention, after the camera leaves the factory and is used for taking a picture, the optical sensor of the camera will output a digital image including M pixels. M is a positive integer. In the following embodiment, it is assumed that the ith pixel among the M pixels has an ith set of original grey levels, wherein i is an integer index ranging from 1 to M. In practical applications, the ith set of original grey levels can include an ith original red grey level, an ith original green grey level, and an ith original blue grey level.

Figure 4:
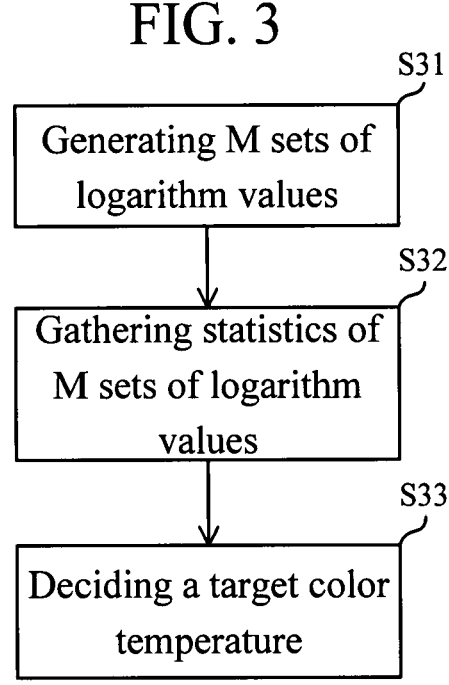
FIG. 4 is a flow diagram of the image processing method of the first preferred embodiment according to the invention.

The first preferred embodiment according to the invention is an image processing method. Referring to FIG. 4, FIG. 4 is the flow diagram of the image processing method. In step S31, M sets of logarithm values are first generated. The ith set of logarithm values among the M sets of logarithm values is generated based on the ith set of original gray levels and a set of adjusting parameters relative to the optical sensor. The set of adjusting parameters was usually pre-stored in the camera before the camera leaves the factory. According to the set of adjusting parameters, the original grey levels of each pixel can be converted into a set of logarithm values, namely, the logarithm values on the second logarithm plane above.

In practical applications, the ith set of logarithm values can be directly converted from the ith set of original grey levels. Step S31 can also convert each set of original grey levels into a set of initial logarithm values corresponding to the first logarithm plane. Then, the set of initial logarithm values is converted into the logarithm values on the second logarithm plane according to the set of adjusting parameters.

As described above, the designer can define a plurality of logarithm ranges according to the second logarithm curve of the camera in advance. Each of logarithm ranges corresponds to a color temperature respectively. In the example shown in FIG. 5D, each of the black coordinate points marked in the coordinate figure represents the one of the M sets of logarithm values. Some coordinate points fall in the logarithm ranges, and some are out of the logarithm ranges.

In step S32, statistics of how many sets of logarithm values (namely, how many coordinate points) are included in each of the logarithm ranges is gathered. As shown in FIG. 5D, there are most coordinate points in the logarithm range 520A. Thus, in this example, step S33 selects the logarithm range 520A as a target logarithm range, and the color temperature corresponding to the logarithm range 520 is determined as the color temperature of the digital image.

Because the second logarithm curve based on the invention is parallel to the transverse axis of the second logarithm plane, all the logarithm ranges can be regular rectangles with frames parallel to the coordinate axis. Thus, in the color temperature determining method according to the invention, whether a certain set of logarithm values is in a certain logarithm range can be judged by directly comparing the coordinate apex of the logarithm ranges and the logarithm values calculated from step S31. In other words, in the color temperature determining method according to the invention, the distance between each of the coordinate values and the Plankian locus or the first logarithm curve is not needed to be complicatedly calculated as in the prior arts.

In addition, the image processing method shown in FIG. 4 can also include white balance correction procedures. The second preferred embodiment according to the invention is also an image processing method. Please refer to FIG. 6, FIG. 6 is a flow diagram of the image processing method. Step. S601~S603 are equivalent to step S31~S33 in FIG. 4. After the target logarithm range and the target color temperature of an image is determined in step S603, the pixels corresponding to the sets of logarithm values included in the target logarithm range are set as target pixels.

Afterward, in step S605, an average red grey level is calculated according to the original red grey levels of the target pixels, an average green grey level is calculated according to the original green grey levels of the target pixels, and an average blue grey level is calculated according to the original blue grey levels of the target pixels. In step S606, the largest one is selected from the average red grey level, the average green grey level, and the average blue grey level as the maximum average value. In step S607, the maximum average value is divided by the average red grey level to obtain a red gain, the maximum average value is divided by the average green grey level to obtain a green gain, and the maximum average value is divided by the average blue grey level to obtain a blue gain.

In step S608, the original red grey level of each of the M pixels is multiplied by the red gain to obtain an adjusted red grey level, the original green grey level of each of the M pixels is multiplied by the green gain to obtain an adjusted green grey level, and the original blue grey level of each of the M pixels is multiplied by the blue gain to obtain an adjusted blue grey level.

In step S609, a target matrix is selected according to the target color temperature decided in step S603. In step S610, the adjusted red grey level, the adjusted green grey level, and the adjusted blue grey level of each of the M pixels are multiplied by the target matrix. After being multiplied by the target matrix, the grey levels of pixels in the digital image are adjusted to meet the color proportion under a white-balance condition. With the above steps, the method can complete white balance and color adjustment for the digital image.

The third preferred embodiment according to the invention is an image processing apparatus. Please refer to FIG. 7A, FIG. 7A shows a block diagram of the image processing apparatus 70. The image processing apparatus 70 includes a logarithm value generating module 701, a statistics module 702, and a color temperature determining module 703. After a camera leaves the factory and shoots a picture, an optical sensor 80 of the camera will output a digital image including M pixels to the image processing apparatus 70. The ith pixel of the M pixels has an ith set of original gray levels.

The logarithm value generating module 701 is used for generating M sets of logarithm values. The ith set of logarithm values among the M sets of logarithm values is generated based on the ith set of original gray levels and a set of adjusting parameters relative to the optical sensor. The statistics module 702 is used for gathering statistics of the M sets of logarithm values. The color temperature determining module 703 is used for determining a target color temperature of the digital image according to the statistics result of the statistics module 702.

In practical applications, the image processing apparatus 70, as shown in FIG. 7B, can further include a parameter module 704 for generating the set of adjusting parameters. In this example, the parameter module 704 includes a receiving unit 704A, a logarithm unit 704B, a first converting unit 704C, and a parameter generating unit 704D.

The receiving unit 704A is used for receiving a plurality of sample pixel outputted by the optical sensor 80. Each of the sample pixels has a set of sample gray levels respectively. The logarithm unit 704B is used for generating a first logarithm curve on a first logarithm plane according to the sets of sample gray levels of the sample pixels. The first converting unit 704C is used for converting the first logarithm curve into a second logarithm curve on a second logarithm plane. The second logarithm curve is approximately parallel to a coordinate axis of the second logarithm plane. The parameter generating unit 704D is used for generating the set of adjusting parameters, provided for the use of the logarithm value generating module 701, according to the difference between the first logarithm curve and the second logarithm curve.

Besides, in practical applications, a plurality of logarithm ranges can be provided in advance. Each of the logarithm ranges corresponds to a color temperature respectively. The statistics module 702 is used for gathering the statistics of how many sets of logarithm values among the M sets of logarithm values are comprised in each of the logarithm ranges. The color temperature determining module 703 can select the logarithm range including most sets of logarithm values as a target logarithm range. The color temperature that corresponds to the target logarithm range is the target color temperature.

The fourth preferred embodiment according to the invention is also an image processing apparatus. Compared to the embodiment shown in FIG. 7A, the image processing apparatus 70 further includes other modules for performing the white balance correction procedure. As shown in FIG. 7C, the image processing apparatus 70 in this embodiment includes not only the logarithm value generating module 701, a statistics module 702, and a color temperature determining module 703, but also a setting module 704, an averaging module 705, a first selecting module 706, a gain generating module 707, a multiplying module 708, a second selecting module 709, and a matrix multiplying module 710.

The setting module 704 is used for setting the pixels corresponding to the sets of logarithm values included in the target logarithm range as a plurality of target pixels. The averaging module 705 is used for calculating an average red grey level according to the original red grey levels of the target pixels, an average green grey level according to the original green grey levels of the target pixels, and an average blue grey level according to the original blue grey levels of the target pixels. The first selecting module 706 is used for selecting the largest one among the average red grey level, the average green grey level, and the average blue grey level as the maximum average value.

The gain generating module 707 is used for dividing the maximum average value by the average red grey level to obtain a red gain, dividing the maximum average value by the average green grey level to obtain a green gain, and dividing the maximum average value by the average blue grey level to obtain a blue gain. The multiplying module 708 is used for multiplying the original red grey level of each of the M pixels by the red gain to obtain an adjusted red grey level, multiplying the original green grey level of each of the M pixels by the green gain to obtain an adjusted green grey level, and multiplying the original blue grey level of each of the M pixels by the blue gain to obtain an adjusted blue grey level.

The second selecting module 709 is used for selecting a target matrix according to the target color temperature. The matrix multiplying module 710 is used for multiplying the adjusted red grey level, the adjusted green grey level, and the adjusted blue grey level of each of the M pixels by the target matrix.

As mentioned above, the Plankian locus after a logarithm conversion is further converted into a horizontal line by the method and apparatus according to the invention. The procedure of judging whether a pixel is in certain color temperature range can accordingly be simplified. Compared to the prior arts, the method and apparatus according to the invention provide a simpler procedure for determining the color temperature. In addition, the method and apparatus according to the invention can also be combined with white balance correction procedures to provide a complete white balance correction plan.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image processing method, a digital image being outputted by an optical sensor and comprising M pixels, M being a positive integer, the ith pixel among the M pixels having an ith set of original gray levels, i being an integer index ranging from 1 to M, the method comprising the steps of:
   (a) generating M sets of logarithm values, the ith set of logarithm values among the M sets of logarithm values being generated based on the ith set of original gray levels and a set of adjusting parameters relative to the optical sensor;
   (b) gathering statistics of the M sets of logarithm values; and
   (c) determining a target color temperature of the digital image according to the gathered statistics of step (b);
   wherein the set of adjusting parameters is generated by the following steps:
   (d1) receiving a plurality of sampled pixels outputted by the optical sensor, each of the sampled pixels having a set of sample gray levels respectively, each set of sample grey levels respectively comprising a red sample grey level (RS), a green sample grey level (GS), and a blue sample grey level (BS);
   (d2) generating a first logarithm curve on a first logarithm plane according to the sets of sample gray levels of the sampled pixels;
   (d3) converting the first logarithm curve into a second logarithm curve on a second logarithm plane, the second logarithm curve being approximately parallel to a coordinate axis of the second logarithm plane; and
   (d4) generating the set of adjusting parameters according to the difference between the first logarithm curve and the second logarithm curve; and
   wherein a longitudinal axis and a transverse axis of the first logarithm plane are Log(GS/RS) and Log(GS/BS) respectively.

2. An image processing method, a digital image being outputted by an optical sensor and comprising M pixels, M being a positive integer, the ith pixel among the M pixels having an ith set of original gray levels, i being an integer index ranging from 1 to M, the method comprising the steps of:
   (a) generating M sets of logarithm values, the ith set of logarithm values among the M sets of logarithm values being generated based on the ith set of original gray levels and a set of adjusting parameters relative to the optical sensor;
   (b) gathering statistics of the M sets of logarithm values; and
   (c) determining a target color temperature of the digital image according to the gathered statistics of step (b);
   wherein step (a) comprises the following sub-steps:
   (a1) calculating an ith set of initial logarithm values according to the ith set of original grey levels, the ith set of original grey levels comprising an ith original red grey level (Ri), an ith original green grey level (Gi), and an ith original blue grey level (Bi); and
   (a2) converting the ith set of initial logarithm values into the ith set of logarithm values according to the set of adjusting parameters, the ith set of initial logarithm values being [Log(Gi/Ri), Log(Gi/Bi)].

3. An image processing method, a digital image being outputted by an optical sensor and comprising M pixels, M being a positive integer, the ith pixel among the M pixels having an ith set of original gray levels, i being an integer index ranging from 1 to M, the method comprising the steps of:
   (a) generating M sets of logarithm values, the ith set of logarithm values among the M sets of logarithm values being generated based on the ith set of original gray levels and a set of adjusting parameters relative to the optical sensor, wherein the set of original grey levels of each of the M pixels comprises an original red grey level, an original green grey level, and an original blue grey level;

(b) gathering statistics of the M sets of logarithm values;

(c) determining a target color temperature of the digital image according to the gathered statistics of step (b), wherein a plurality of logarithm ranges are provided in advance, statistics of how many sets of logarithm values among the M sets of logarithm values are comprised in each of the logarithm ranges is gathered in step (b), each of the logarithm ranges corresponds to a color temperature respectively, a logarithm range comprising most sets of logarithm values is selected as a target logarithm range in step (c), and a color temperature corresponding to the target logarithm range is the target color temperature;

(e1) setting the pixels corresponding to the sets of logarithm values comprised in the target logarithm range as a plurality of target pixels; and (e2) calculating an average red grey level according to the original red grey levels of the target pixels, calculating an average green grey level according to the original green grey levels of the target pixels, and calculating an average blue grey level according to the original blue grey levels of the target pixels.

4. The image processing method of claim 3, further comprising:

(f1) selecting the largest one from the average red grey level, the average green grey level, and the average blue grey level as a maximum average value;

(f2) dividing the maximum average value by the average red grey level to obtain a red gain, dividing the maximum average value by the average green grey level to obtain a green gain, dividing the maximum average value by the average blue grey level to obtain a blue gain; and (f3) multiplying the original red grey level of each of the M pixels by the red gain to obtain an adjusted red grey level, multiplying the original green grey level of each of the M pixels by the green gain to obtain an adjusted green grey level, and multiplying the original blue grey level of each of the M pixels by the blue gain to obtain an adjusted blue grey level.

5. The image processing method of claim 4, further comprising:

(g1) selecting a target matrix according to the target color temperature; and (g2) multiplying the adjusted red grey level, the adjusted green grey level, and the adjusted blue grey level of each of the M pixels by the target matrix.

6. An image processing apparatus, a digital image being outputted by an optical sensor and comprising M pixels, M being a positive integer, the ith pixel among the M pixels having an ith set of original gray levels, i being an integer index ranging from 1to M, the apparatus comprising:

a logarithm value generating module for generating M sets of logarithm values, the ith set of logarithm values among the M sets of logarithm values being generated based on the ith set of original gray levels and a set of adjusting parameters relative to the optical sensor;

a statistics module for gathering statistics of the M sets of logarithm values;

a color temperature determining module for determining a target color temperature of the digital image according to the gathered statistics of the statistics module; and a parameter module, for generating the set of adjusting parameters, comprising:

a receiving unit for receiving a plurality of sampled pixels outputted by the optical sensor, each of the sampled pixels having a set of sample gray levels respectively;

a logarithm unit for generating a first logarithm curve on a first logarithm plane according to the sets of sample gray levels of the sampled pixels;

a first converting unit for converting the first logarithm curve into a second logarithm curve on a second logarithm plane, the second logarithm curve being approximately parallel to a coordinate axis of the second logarithm plane; and a parameter generating unit for generating the set of adjusting parameters according to the difference between the first logarithm curve and the second logarithm curve;

wherein each set of sample grey levels respectively comprises a red sample grey level (RS), a green sample grey level (GS), and a blue sample grey level (BS); and wherein a longitudinal axis and a transverse axis of the first logarithm plane are $Log(GS/RS)$ and $Log(GS/BS)$ respectively.

7. An image processing apparatus, a digital image being outputted by an optical sensor and comprising M pixels, M being a positive integer, the ith pixel among the M pixels having an ith set of original gray levels, i being an integer index ranging from 1 to M, the apparatus comprising:

a logarithm value generating module for generating M sets of logarithm values, the ith set of logarithm values among the M sets of logarithm values being generated based on the ith set of original gray levels and a set of adjusting parameters relative to the optical sensor;

a statistics module for gathering statistics of the M sets of logarithm values; and a color temperature determining module for determining a target color temperature of the digital image according to the gathered statistics of the statistics module;

wherein the logarithm value generating module comprises:

a first calculating unit for calculating an ith set of initial logarithm values according to the ith set of original grey levels; and a second converting unit for converting the ith set of initial logarithm values into the ith set of logarithm values according to the set of adjusting parameters;

wherein the ith set of original grey levels comprises an ith original red grey level (Ri), an ith original green grey level (Gi), and an ith original blue grey level (Bi); and wherein the ith set of initial logarithm values are $[Log(Gi/Ri), Log(Gi/Bi)]$.

8. An image processing apparatus, a digital image being outputted by an optical sensor and comprising M pixels, M being a positive integer, the ith pixel among the M pixels having an ith set of original gray levels, i being an integer index ranging from 1to M, the apparatus comprising:

a logarithm value generating module for generating M sets of logarithm values, the ith set of logarithm values among the M sets of logarithm values being generated based on the ith set of original gray levels and a set of adjusting parameters relative to the optical sensor, wherein the set of original grey levels of each of the M pixels comprises an original red grey level, an original green grey level, and an original blue grey level;

a statistics module for gathering statistics of the M sets of logarithm values, wherein a plurality of logarithm ranges are provided in advance, statistics of how many sets of logarithm values among the M sets of logarithm values are comprised in each of the logarithm ranges is gathered by the statistics module;

a color temperature determining module for determining a target color temperature of the digital image according to the gathered statistics of the statistics module, wherein each of the logarithm ranges corresponds to a color temperature respectively, a logarithm range comprising most sets of logarithm values is selected as a target logarithm range by the color temperature determining module, a color temperature corresponding to the target logarithm range is the target color temperature;

a setting module for setting the pixels corresponding to the sets of logarithm values comprised in the target logarithm range as a plurality of target pixels; and an averaging module for calculating an average red grey level according to the original red grey levels of the target pixels, an average green grey level according to the original green grey levels of the target pixels, and an average blue grey level according to the original blue grey levels of the target pixels.

9. The image processing apparatus of claim 8, further comprising:

a first selecting module for selecting the largest one from the average red grey level, the average green grey level, and the average blue grey level as a maximum average value;

a gain generating module for dividing the maximum average value by the average red grey level to obtain a red gain, dividing the maximum average value by the average green grey level to obtain a green gain, dividing the maximum average value by the average blue grey level to obtain a blue gain; and a multiplying module for multiplying the original red grey level of each of the M pixels by the red gain to obtain an adjusted red grey level, multiplying the original green grey level of each of the M pixels by the green gain to obtain an adjusted green grey level, and multiplying the original blue grey level of each of the M pixels by the blue gain to obtain an adjusted blue grey level.

10. The image processing apparatus of claim 9, further comprising:

a second selecting module for selecting a target matrix according to the target color temperature; and a matrix multiplying module for multiplying the adjusted red grey level, the adjusted green grey level, and the adjusted blue grey level of each of the M pixels by the target matrix.

* * * * *